(12) United States Patent
Ebihara et al.

(10) Patent No.: US 12,270,822 B2
(45) Date of Patent: Apr. 8, 2025

(54) AUTOMATIC ANALYSIS DEVICE

(71) Applicant: Hitachi High-Tech Corporation, Tokyo (JP)

(72) Inventors: Daisuke Ebihara, Tokyo (JP); Shinya Matsuoka, Tokyo (JP); Makoto Nogami, Tokyo (JP); Taku Sakazume, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 113 days.

(21) Appl. No.: 17/284,687

(22) PCT Filed: Aug. 26, 2019

(86) PCT No.: PCT/EP2019/033233
§ 371 (c)(1),
(2) Date: Apr. 12, 2021

(87) PCT Pub. No.: WO2020/084886
PCT Pub. Date: Apr. 30, 2020

(65) Prior Publication Data
US 2024/0319222 A1    Sep. 26, 2024

(30) Foreign Application Priority Data
Oct. 25, 2018 (JP) .................. 2018-200985

(51) Int. Cl.
*G01N 35/10* (2006.01)
*G01N 35/00* (2006.01)

(52) U.S. Cl.
CPC ..... *G01N 35/1016* (2013.01); *G01N 35/0098* (2013.01)

(58) Field of Classification Search
CPC .......... G01N 35/1016; G01N 35/1009; G01N 35/10; G01N 35/00; G01N 35/0098
See application file for complete search history.

(56) References Cited

U.S. PATENT DOCUMENTS

2006/0204997 A1* 9/2006 Macioszek .......... C12Q 1/6813
                                                           435/6.15
2008/0217254 A1    9/2008 Anderson
(Continued)

FOREIGN PATENT DOCUMENTS

JP    2000-65797 A    3/2000
JP    2007-303937 A   11/2007
(Continued)

OTHER PUBLICATIONS

European Office Action issued in European Application No. 19 876 425.0 dated Apr. 4, 2024 (9 pages).
(Continued)

*Primary Examiner* — Mohamed Charioui
(74) *Attorney, Agent, or Firm* — Crowell & Moring LLP (57) ABSTRACT

Provided is an automatic analysis device and an analysis method which are capable of reliably detecting an abnormality in a dispensing amount of a solution such as a specimen or a reagent to be dispensed and suppressing a decrease in analysis accuracy. Included are a specimen dispensing mechanism 113 that dispenses an analysis target specimen in a reaction vessel 116, a reagent dispensing mechanism 123 that dispenses another dispensing object different from the specimen in the reaction vessel 116, and a mass analyzing unit 133 that detects and analyzes a specific component in a reaction solution in which a specimen dispensed into the reaction vessel 116 and another dispensing object are mixed to each other, in which it is determined whether a dispensed liquid amount of the another dispensing object is abnormal or not, based on a detection result of a standard substance for dispensing inspection which has been added in advance to the another dispensing object, which is detected at the same time with (Continued)

the detection of the analysis target component of the specimen in the reaction solution in the mass analyzing unit 133.

7 Claims, 8 Drawing Sheets

(56) References Cited

U.S. PATENT DOCUMENTS

| | | | |
|---|---|---|---|
| 2009/0130679 A1 | 5/2009 | Wu et al. | |
| 2009/0254309 A1* | 10/2009 | Kubota | G01N 21/763 |
| | | | 702/185 |
| 2010/0200405 A1* | 8/2010 | Lenz | B03C 1/0332 |
| | | | 204/600 |
| 2011/0287446 A1* | 11/2011 | Kanda | G01N 33/6848 |
| | | | 435/7.1 |
| 2012/0322139 A1 | 12/2012 | Nogami et al. | |
| 2017/0327867 A1* | 11/2017 | Dohale | B01L 3/502 |
| 2018/0269047 A1 | 9/2018 | Zhu | |

FOREIGN PATENT DOCUMENTS

| | | |
|---|---|---|
| JP | 2011-153944 A | 8/2011 |
| JP | 2011-179983 A | 9/2011 |
| WO | WO 02/060565 A1 | 8/2002 |
| WO | WO 2011/108177 A1 | 9/2011 |

OTHER PUBLICATIONS

International Preliminary Report on Patentability (PCT/IB/338 & PCT/IB/373) issued in PCT Application No. PCT/JP2019/033233 dated May 6, 2021, including English translation of document C2 (Japanese-language Written Opinion (PCT/ISA/237) previously filed on Apr. 12, 2021) (eight (8) pages).

International Search Report (PCT/ISA/210) issued in PCT Application No. PCT/JP2019/033233 dated Nov. 5, 2019 with English translation (five (5) pages).

Japanese-language Written Opinion (PCT/ISA/237) issued in PCT Application No. PCT/JP2019/033233 dated Nov. 5, 2019 (four (4) pages).

* cited by examiner

LIST OF MEASURED VALUES

| No | ITEM | MEASUREMENT DATE AND TIME | MEASURED VALUES | REMARKS |
|---|---|---|---|---|
| 1 | A | 2018/05/15 08:50 | 2,152 | |
| 2 | A | 2018/05/15 08:51 | 2,258 | |
| 3 | B | 2018/05/15 08:52 | 5,552 | |
| 4 | B | 2018/05/15 08:53 | 5,145 | |
| 5 | B | 2018/05/15 08:54 | 4,750 | |
| 6 | B | 2018/05/15 08:55 | 5,874 | |
| 7 | A | 2018/05/15 08:56 | 2,087 | |
| 8 | A | 2018/05/15 08:57 | 2,658 | |
| 9 | C | 2018/05/15 08:58 | 2,580 | |
| 10 | C | 2018/05/15 08:59 | 148 | *ABNORMALITY IN DISPENSING AMOUNT |

ALARM INFORMATION

| No. | ALARM CONTENT | DESCRIPTION |
|---|---|---|
| 10 | ABNORMALITY IN DISPENSING AMOUNT | DISPENSING AMOUNT OF REAGENT AT THIS TIME OF MEASUREMENT MAY BE REMARKABLY DIFFERENT FROM OTHER MEASUREMENT. PLEASE CAREFULLY EXAMINE VALIDITY OF MEASUREMENT RESULTS. |

[FIG. 8]

AUTOMATIC ANALYSIS DEVICE

TECHNICAL FIELD

The present invention relates to an automatic analysis device configured to analyze a specimen.

BACKGROUND ART

As a method for analyzing specific components contained in a specimen, for example, an LC-MS in which a liquid chromatography (LC) and a mass spectrometry (MS) are connected online is used. The use of this LC-MS also extends to a field of clinical test in which analysis of a biological specimen such as blood or urine is performed by an automatic analysis device.

When the biological specimen such as blood or urine (hereinafter simply referred to as specimen) is analyzed by the LC-MS, it is necessary to perform a pretreatment to improve a degree of purification of the specimen. Examples of the pretreatment of the specimen include solid phase extraction (SPE), liquid-liquid extraction (LLE), and the like. Particularly, since the SPE is easy to be connected to the LC-MS online, it is possible to automate the pretreatment by the SPE and the analysis by the LC-MS in an integrated manner.

As a technique for performing such automation of the analysis using the SPE, for example, PTL 1 discloses an analysis device including: a sample disc on which a sample container is mounted; a reagent disc on which a reagent container is mounted; a first disc on which a first container for purifying a measurement target component of the sample is mounted; a second disc on which a second container for purifying the sample purified in the first container is mounted; and a mass analyzing unit for measuring the sample purified in the second container.

CITATION LIST

Patent Literature

PTL 1: WO 2011/108177

SUMMARY OF INVENTION

Technical Problem

In such an automatic analysis device in the related art, a predetermined amount of a solution of a specimen or a reagent is dispensed into a reaction vessel to perform various processes related to the analysis. For example, during measurement of a drug concentration in blood, a deproteinization treatment is performed in which a reagent such as an organic solvent is dispensed and added as a deproteinization agent to the blood dispensed into the reaction vessel to denature and precipitate proteins in the blood. However, since an amount of the specimen or the reagent dispensed into the reaction vessel is small, an influence of dispensing accuracy on an analysis result is inevitably large. For example, when the dispensing amount of the reagent is less than the predetermined amount, an amount of a drug to be eluted decreases and thus shows a false low value, which may decrease analysis accuracy.

The invention has been made in view of the above circumstances, and an object thereof is to provide an automatic analysis device and an analysis method capable of reliably detecting an abnormality in a dispensing amount of a solution such as a specimen or a reagent to be dispensed and preventing a decrease in analysis accuracy.

Solution to Problem

In order to achieve the above-mentioned object, the invention provides an automatic analysis device including: a first dispensing mechanism that dispenses an analysis target specimen in a reaction vessel; a second dispensing mechanism that dispenses another dispensing object different from the specimen in the reaction vessel; an analysis mechanism that detects and analyzes a specific component in a reaction solution in which the specimen dispensed in the reaction vessel and the another dispensing object are mixed to each other; and a control device, in which the control device determines whether a dispensed liquid amount of the another dispensing object is abnormal or not, based on a detection result of a standard substance for dispensing inspection which has been added in advance to the another dispensing object, which is detected at the same time with detection of an analysis target component of the specimen in the reaction solution in the analysis mechanism.

Advantageous Effect

It is possible to reliably detect an abnormality in a dispensing amount of a solution such as a specimen or a reagent to be dispensed and prevent a decrease in analysis accuracy.

DESCRIPTION OF EMBODIMENTS

Hereinafter, an embodiment of the invention will be described with reference to the drawings. In the present embodiment, although an automatic analysis device in which a liquid chromatography and a mass spectrometry (LC-MS) are combined as an analysis mechanism with a specimen pretreatment function is exemplified and described, the invention also can be applied to, for example, an automatic analysis device in which a separation unit such as a capillary electrophoresis and a detector such as an absorptiometer are combined as the analysis mechanism. In the present embodiment, although a deproteinizing agent is exemplified and described as a target to which a standard substance for dispensing inspection is added, the invention can be applied to all solutions to be dispensed into a specimen during analysis, such as an internal standard substance or a magnetic bead.

Figure 1:
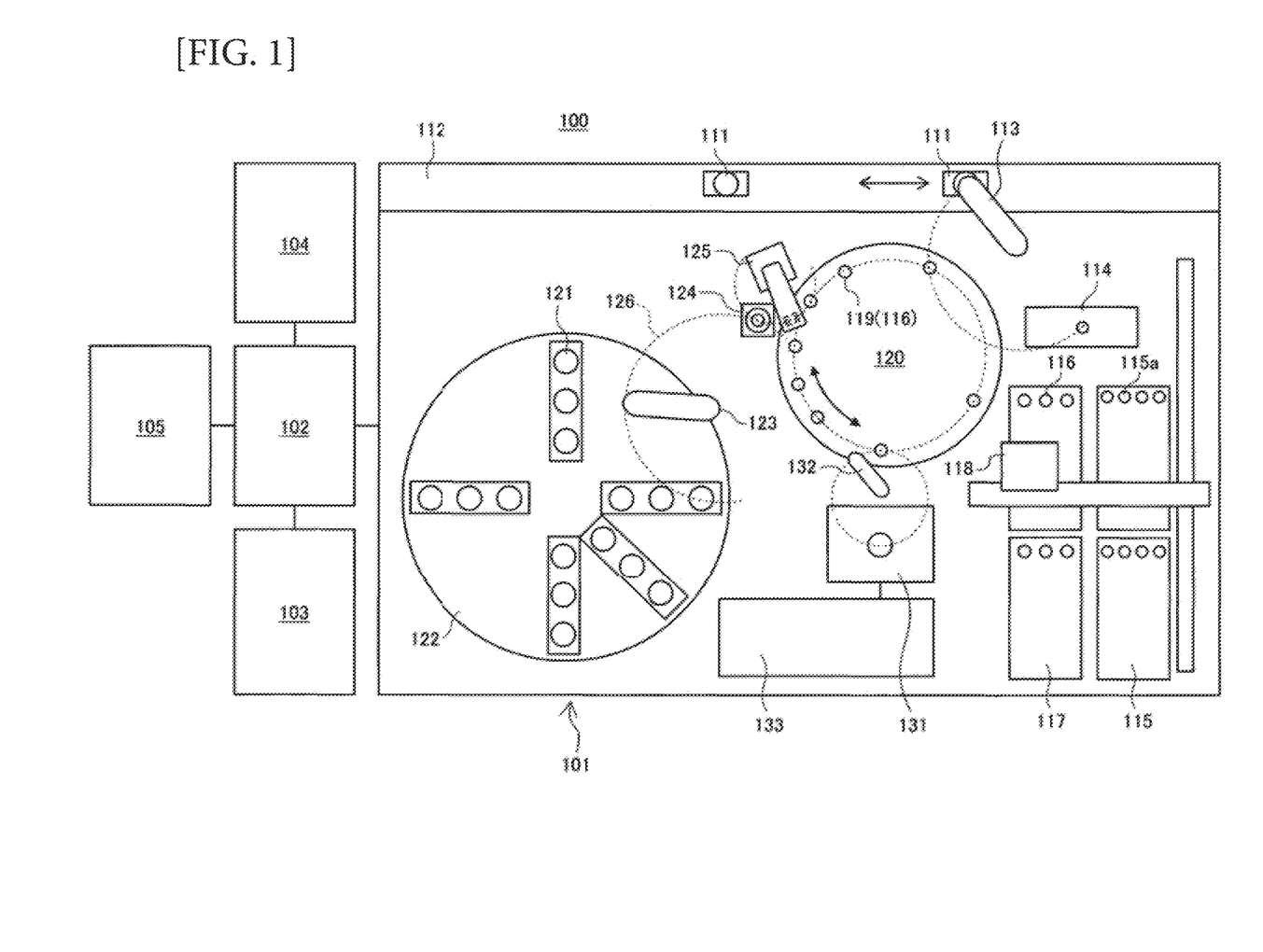
FIG. 1 is a diagram schematically illustrating an overall configuration of an automatic analysis device according to an embodiment of the invention.

FIG. 1 is a diagram schematically illustrating an overall configuration of the automatic analysis device according to the present embodiment.

In FIG. 1, an automatic analysis device 100 schematically includes an analysis unit 101 for performing an analysis operation, a control unit 102 for controlling an overall operation of the device, an input unit 103 for a user to input information to the device, a display unit 104 for displaying information to the user, and a storage unit 105 such as a storage medium for storing various information related to the control of the automatic analysis device 100. The control unit 102, the input unit 103, the display unit 104, and the storage unit 105 constitute a control device that controls the overall operation of the automatic analysis device 100. In the present embodiment, the input unit 103 and the display unit 104 are separately shown, but the input unit 103 and the display unit 104 may be integrally configured as, for example, a touch panel type monitor.

The analysis unit 101 includes: a transport mechanism 112 that transports a specimen container 111 storing the specimen, which is an analysis target, to a specimen dispensing position; a reaction vessel disc 120 capable of retaining a solution in a reaction vessel 116 at a constant temperature by mounting the reaction vessel 116 in a plurality of opening parts 119; a reagent disc 122 that retains a plurality of reagent containers 121 storing reagents; a specimen dispensing mechanism 113 that dispenses the specimen from the specimen container 111 transported to the specimen dispensing position to the reaction vessel 116 on the reaction vessel disc 120; a reagent dispensing mechanism 123 that dispenses the reagents from the reagent containers 121 to the reaction vessel 116 on the reaction vessel disc 120; a dispensing chip-mounted rack 115 on which an unused disposable dispensing chip 115a attached to a nozzle of the specimen dispensing mechanism 113 is mounted; a dispensing chip attaching and detaching unit 114 that removes and then discards a used dispensing chip 115a from the nozzle of the specimen dispensing mechanism 113, or attaches an unused dispensing chip 115a to the nozzle; a reaction vessel-mounted rack 117 on which an unused reaction vessel 116 is mounted; a transport mechanism 118 that transports the unused dispensing chip 115a from the dispensing chip-mounted rack 115 to the dispensing chip attaching and detaching unit 114, transports a used reaction vessel 116 from the opening part 119 of the reaction vessel disc 120 to a discarding unit (not shown), and transports the unused reaction vessel 116 from the reaction vessel-mounted rack 117 to the opening part 119 of the reaction vessel disc 120; a magnetic separation mechanism 124 that separates magnetic beads in the solution stored in the reaction vessel 116 by magnetic force of a magnet; a transport mechanism 125 that transports the reaction vessel 116 between the reaction vessel disc 120 and the magnetic separation mechanism 124; a dispensing mechanism for separation unit 132 that dispenses the solution in the reaction vessel 116 into a separation unit that separates components in the solution in the reaction vessel 116; and a mass analyzing unit 133 that detects and analyzes the components in the solution separated by the separation unit 131.

The magnetic separation mechanism 124 is provided on a rotating orbit 126 of the reagent dispensing mechanism 123. The reagent dispensing mechanism 123 is capable of discharging the reagent to the reaction vessel 116 supported by the magnetic separation mechanism 124 or sucking the solution in the reaction vessel 116.

The reaction vessel disc 120 functions as an incubator that keeps the reaction vessel 116 installed in the opening part 119 at a constant temperature, and incubates the reaction vessel 116 installed in the opening part 119 for a certain period of time.

The separation unit 131 is, for example, a liquid chromatography (LC) and includes a column or the like having a function of separating components in a reaction solution dispensed by the dispensing mechanism for separation unit 132. The separation unit 131 separates the components in the reaction solution dispensed from the reaction vessel 116 by the dispensing mechanism for separation unit 132, and sequentially introduces the separated components into the mass analyzing unit 133.

The mass analyzing unit 133 is, for example, a mass spectrometry (MS) and includes an electron multiplier or the like having a function of ionizing and mass-analyzing the component introduced from the separation unit 131. The mass analyzing unit 133 ionizes the component introduced from the separation unit 131, detects an amount of ions (that is, an amount of the component), and outputs a detection result to the control unit 102.

The control unit 102 calculates a concentration value of the component in the specimen using the detection result (the amount of ions) from the mass analyzing unit 133 and a calibration curve obtained in advance, stores the concentration value in the storage unit 105 as an analysis result, and displays the analysis result on the display unit 104.

As a method for obtaining the calibration curve, for example, first, a standard substance having a known concentration is analyzed for a plurality of concentrations. Then, with respect to a mass/charge ratio (m/z) of ions derived from the standard substance, a time-dependent ion amount, that is, a time-dependent ionic strength (mass chromatogram) is obtained, and a peak area of the mass chromatogram is obtained. The calibration curve is created based on a relation between the area and the concentration of the standard substance. By using the calibration curve obtained in this way, it is possible to detect the concentration of the component in the specimen whose concentration is unknown and which has an analysis target component same as that of the standard substance. Specifically, the peak area of the mass chromatogram is obtained for an analysis target specimen, and the concentration of the analysis target component is determined based on a correspondence between the peak area of the mass chromatogram and the calibration curve. When the ionic strength to be detected is standardized based on an ionic strength derived from an internal standard substance, a comparison between data can be performed under high accuracy. That is, it is possible to compare and verify the ionic strength between each analysis, which may show some fluctuation for each analysis due to an influence of a specimen pretreatment, specimen injection into the LC-MS, ionization in the LC-MS, and the like. This method is called an internal standard method.

Here, first, basic steps of an analysis process will be described.

Figure 2:
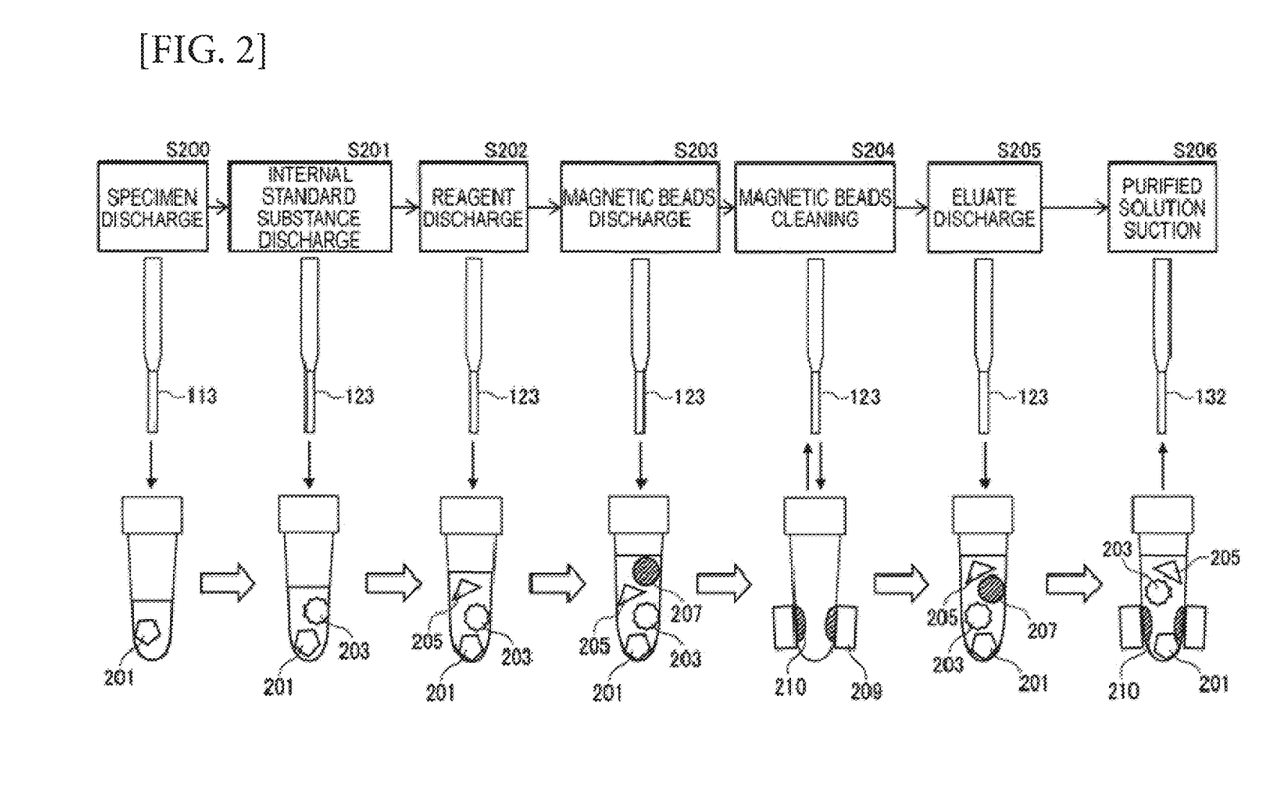
FIG. 2 is a diagram illustrating an example of a pretreatment step of an analysis process by the automatic analysis device.

FIG. 2 is a diagram illustrating an example of a pretreatment step of the analysis process by the automatic analysis device.

Before starting the pretreatment, the unused reaction vessel 116 is installed from the reaction vessel-mounted rack 117 on the opening part 119 of the reaction vessel disc 120 by the transport mechanism 118. Before dispensing the specimen, the specimen dispensing mechanism 113 is made to access the dispensing chip attaching and detaching unit 114, and then the dispensing chip 115a is attached to a tip of the nozzle.

In the pretreatment, first, a specimen containing an analysis target component 201 is sucked from the specimen container 111 via the dispensing chip 115a by the specimen dispensing mechanism 113, and then discharged into the reaction vessel 116 on the reaction vessel disc 120 (step S200). When the specimen dispensing mechanism 113 finishes dispensing the specimen from one specimen container 111, the dispensing chip attaching and detaching unit 114 discards the used dispensing chip 115a and attaches an unused dispensing chip 115a.

Then, as a reagent corresponding to the analysis target component 201, an internal standard substance 203 is sucked from the reagent container 121 on the reagent disc 122 by the reagent dispensing mechanism 123, and then discharged into the reaction vessel 116 (step S201).

Then, as a reagent, a deproteinizing agent is sucked from the reagent container 121 on the reagent disc 122 by the reagent dispensing mechanism 123, and then discharged into the reaction vessel 116 (step S202). As will be described later, the reagent container 121 storing the deproteinizing agent according to the present embodiment is added with a predetermined standard substance for dispensing inspection 205 having a known concentration.

Then, as a reagent, a suspension of magnetic beads 207 is sucked from the reagent container 121 on the reagent disc 122 by the reagent dispensing mechanism 123, and then discharged into the reaction vessel 116 (step S205).

Then, the reaction vessel 116 into which the specimen, the internal standard substance 203, and the magnetic beads 207 are dispensed is transported to the magnetic separation mechanism 124 by the transport mechanism 125 to clean the magnetic beads 207 (step S205). With the magnetic separation mechanism 124, the magnetic beads 207 retaining the analysis target component 201, the internal standard substance 203, and the standard substance for dispensing inspection 205 are collected on an inner wall surface of the reaction vessel 116 by magnetic force of a magnet 209 arranged at a position along an outer surface of the reaction vessel 116 (in FIG. 2, shown as a magnetic bead group 210). In this state, the reagent dispensing mechanism 123 sucks the solution in the reaction vessel 116 and then discards the same. At this time, the analysis target component 201, the internal standard substance 203, and the standard substance for dispensing inspection 205 retained by the magnetic beads 207 and the magnetic beads 207 remain in the reaction vessel 116. Then, a cleaning solution for cleaning impurities other than the substances retained by the magnetic beads 207 (the analysis target component 201, the internal standard substance 203, and the standard substance for dispensing inspection 205) is sucked from the reagent container 121 on the reagent disc 122 by the reagent dispensing mechanism 123, and then discharged into the reaction vessel 116. At this time, constraint by the magnetic force of the magnet 209 to the magnetic beads 207 may be temporarily released. Then, under a state where the magnetic beads 207 are recollected on the inner wall surface of the reaction vessel 116 by the magnet 209, the reagent dispensing mechanism 123 cleans the magnetic beads 207 by sucking the solution (the cleaning solution) in the reaction vessel 116 and the discarding the solution.

Then, an elution that elutes the analysis target component 201, the internal standard substance 203, and the standard substance for dispensing inspection 205 from the magnetic beads 207 is sucked as a reagent from the reagent container 121 on the reagent disc 122 by the reagent dispensing mechanism 123, and then discharged into the reaction vessel 116 (step S206).

Then, under a state where the magnetic beads 207 are collected on the inner wall surface of the reaction vessel 116 by the magnetic force of the magnet 209, the solution (purified solution) in the reaction vessel 116 is sucked by the reagent dispensing mechanism 123 and then discharged into an unused reaction vessel 116 on the reaction vessel disc 120, which is different from the reaction vessel 116 and arranged on the magnetic separation mechanism 124 (step S207). If necessary, incubation is performed on the purified solution stored in the reaction vessel 116 on the reaction vessel disc 120.

The purified solution obtained by the above pretreatment step is sucked from the reaction vessel 116 and then discharged into the separation unit 131 by the dispensing mechanism for separation unit 132, and the component separated by the separation unit 131 is ionized by the mass analyzing unit 133 to detect the amount of ions (that is, the amount of the component) thereof. The detection result of the mass analyzing unit 133 is output to the control unit 102, and the concentration value of the component in the specimen is calculated using the calibration curve.

Next, a basic principle of a dispensing amount abnormality determination process in the present embodiment will be described. The dispensing amount abnormality determination process of the present embodiment is a process of determining presence or absence of an abnormality in a dispensing amount of a solution such as a reagent to be dispensed into a specimen, which is an analysis target.

Figure 3:
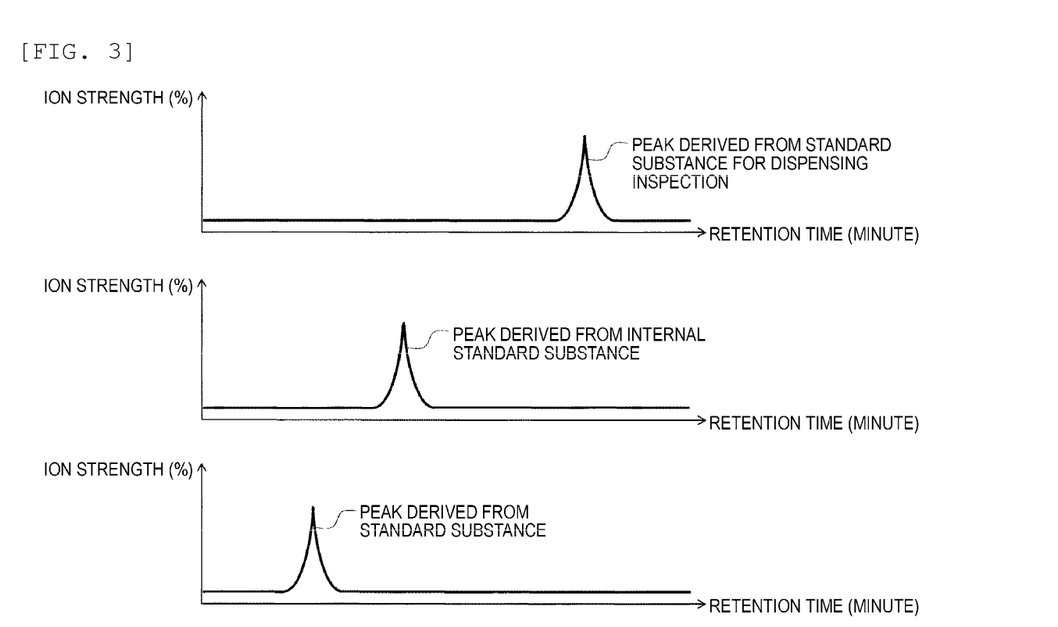
FIG. 3 is a diagram illustrating a case where mass chromatograms derived from each of a standard substance for dispensing inspection, an internal standard substance, and a standard substance are compared to each other.
Figure 4:
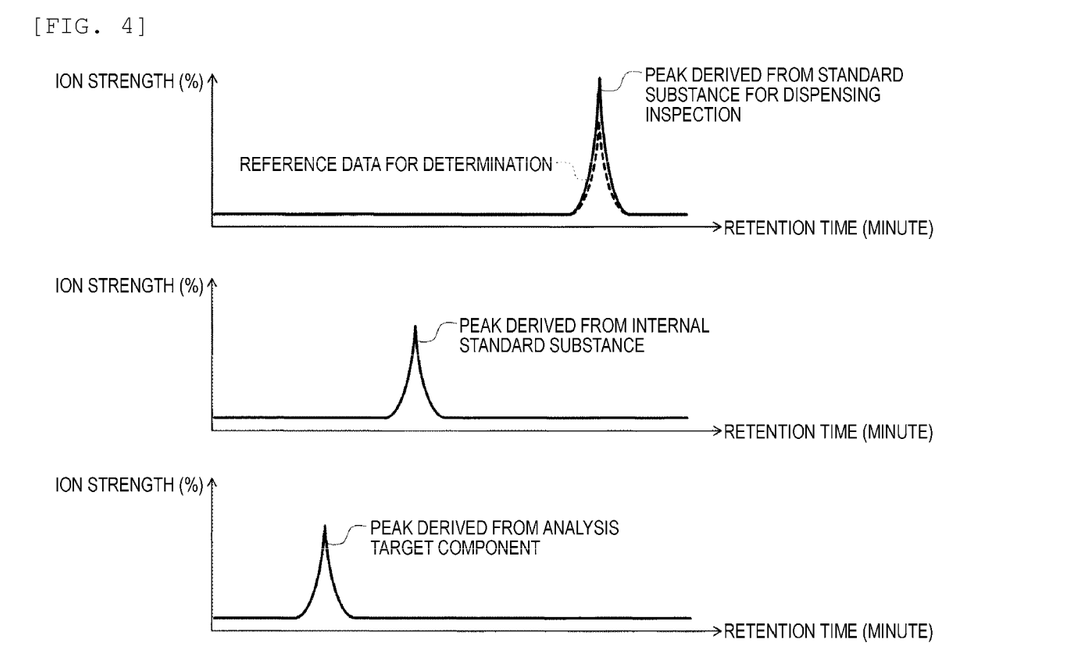
FIG. 4 is a diagram illustrating a case where mass chromatograms derived from each of the standard substance for dispensing inspection, the internal standard substance, and an analysis target component are compared to each other.
Figure 5:
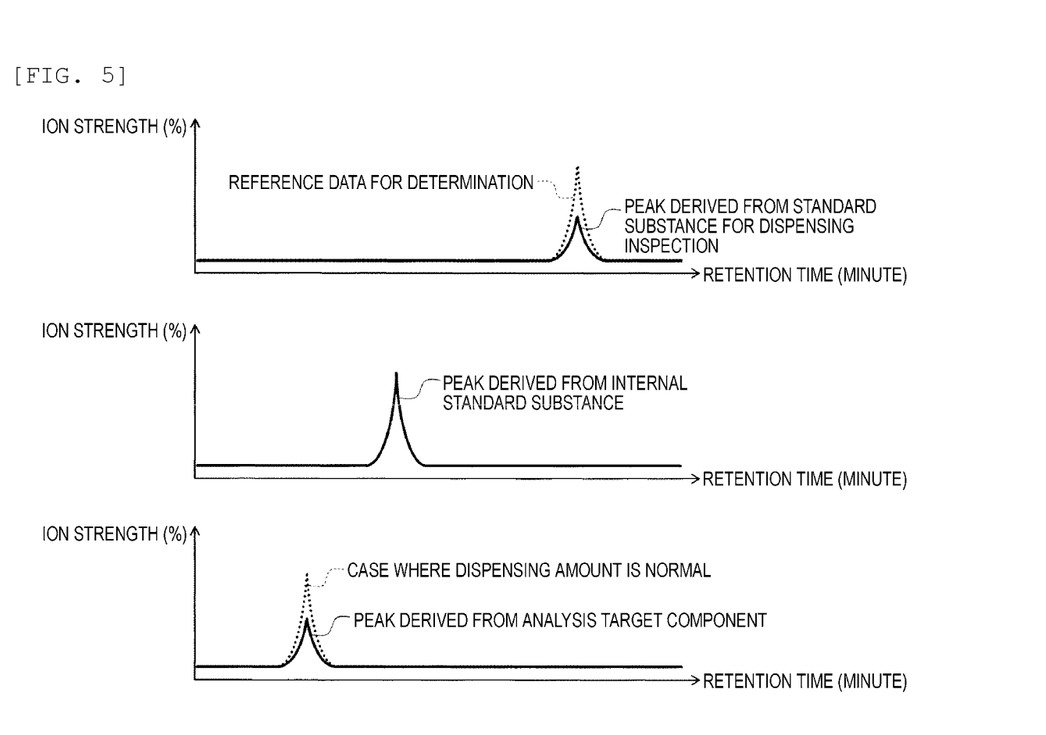
FIG. 5 is a diagram illustrating a case where mass chromatograms derived from each of the standard substance for dispensing inspection, the internal standard substance, and the analysis target component are compared to each other.

FIGS. 3 to 5 are diagrams schematically showing examples of a mass chromatogram obtained by the analysis unit for each of the standard substance for dispensing inspection, the internal standard substance, the standard substance, and the analysis target component, in which a vertical axis shows the ionic strength, and a horizontal axis shows an LC retention time. FIG. 3 illustrates a case where the mass chromatograms derived from the standard substance for dispensing inspection, the internal standard substance, and the standard substance are compared to each other; FIG. 4 illustrates a case where the mass chromatograms derived from the standard substance for dispensing inspection, the internal standard substance, and the analysis target component are compared to each other; and FIG. 5 illustrates a case where the mass chromatograms derived from the standard substance for dispensing inspection, the internal standard substance, and the analysis target component are compared to each other.

In the dispensing amount abnormality determination process of the present embodiment, the standard substance for dispensing inspection is added in advance to the solution (for example, the deproteinizing agent), which is a target solution of the dispensing amount abnormality determination process. A substance that is detected at the same time as the analysis target component within a range of the LC retention time in which the analysis target component of the specimen, which is the analysis target, is detected, is selected as the standard substance for dispensing inspection.

The standard substance having a known concentration is analyzed according to the steps of the analysis process, and a mass chromatogram of the standard substance (see FIG. 3 and the like) is obtained in advance and recorded as reference data for determination in the storage unit 105.

Here, when the analysis target specimen is analyzed according to the steps of the analysis process and a mass chromatogram is obtained, data including peaks derived from the analysis target component of the specimen and the internal standard substance (hereafter referred to as obtained data) is obtained, and data including a peak derived from the standard substance for dispensing inspection within the same range of the LC retention time is also obtained (see FIGS. 4 and 5).

In the case of comparing the obtained mass chromatograms derived from the component and substances to each other, the comparison is performed after standardizing the data. The data standardization is performed by, for example, comparing the peaks at the same retention time and then calculating a percentage of the peak area of the obtained data when the peak area of the reference data for determination is 100%. For example, when the peak area of the obtained data is 97% of the peak area of the reference data for determination, it is determined that there is a difference of 3%. Here, a difference ratio represented by the following (Equation 1) is defined as an index showing a degree of mismatch between the reference data for determination and the obtained data.

[Equation 1]

$$\text{Difference ratio (\%)} = |1 - \text{obtain data}/\text{reference data for determination}| \times 100 \quad \text{(Equation 1)}$$

In the dispensing amount abnormality determination process of the present embodiment, the difference ratio given by the above (Equation 1) is compared to a preset difference ratio threshold value, and the presence or absence of the abnormality in the dispensing amount is determined based on a comparison result. That is, the presence or absence of the abnormality in the dispensing amount can be temporarily determined by calculating the difference ratio at the same time as calculating the concentration of the analysis target component and comparing the difference ratio to the difference ratio threshold value.

The difference ratio t threshold value, which is a determination standard, is preset before the analysis process and the dispensing amount abnormality determination process, and is stored in the storage unit 105 in the same manner as the reference data for determination. The difference ratio threshold value may be appropriately input by an operator. It is known that a standard measurement error of the LC-MS is approximately 5% to 10%. Therefore, in the present embodiment, a case where the difference ratio threshold value is set to 15% will be exemplified and described. That is, when the difference ratio exceeds 15%, it is determined that there is an abnormality in the dispensing amount. Since it is considered that the measurement error depends on devices, the difference ratio threshold value may be set for each device so as to further improve accuracy of abnormality determination of the dispensing amount.

For example, in the case illustrated in FIG. 4, when the reference data for determination is compared to the obtained data having the peak derived from the standard substance for dispensing inspection, the peak area derived from the standard substance for dispensing inspection is larger in the data obtained during specimen analysis than in the reference data for determination. Therefore, when the difference ratio exceeds the difference ratio threshold value (15%), it is determined that there is an abnormality that the dispensing amount of the deproteinizing agent containing the standard substance for dispensing inspection increases. Assuming that the amount of the deproteinizing agent for eluting the analysis target component is sufficient when the dispensing amount is normal, since an elution amount of the analysis target component does not change even if the dispensing amount of the deproteinizing agent increases, the peak area derived from the analysis target component does not change.

In the case illustrated in FIG. 5, when the reference data for determination is compared to the obtained data of the peak derived from the standard substance for dispensing inspection, the peak area derived from the standard substance for dispensing inspection is smaller in the data obtained during specimen analysis than in the reference data for determination. Therefore, when the difference ratio exceeds the difference ratio threshold value (15%), it is determined that there is an abnormality that the dispensing amount of the deproteinizing agent containing the standard substance for dispensing inspection decreases. In addition, the peak area derived from the analysis target component also decreases. Assuming that the amount of the deproteinizing agent for eluting the analysis target component is sufficient when the dispensing amount is normal, when the dispensing amount of the deproteinizing agent decreases, at the same time, the elution amount of the analysis target component decreases and the peak area decreases, so that the concentration of the analysis target component is calculated to be small. In this case, even if the data derived from the analysis target component is standardized by the data derived from the internal standard substance by the internal standard method, since it is not possible to correct a fluctuation in the dispensing amount of the deproteinizing agent, the fluctuation may be corrected by standardizing the data derived from the analysis target component with the data derived from the standard substance for dispensing inspection.

Here, an outline of a selection method of the standard substance for dispensing inspection will be described.

In the MS, it is common technical knowledge to use, as the internal standard substance, an isotope-labeled stable isotope compound of the analysis target component or a compound having chemical and physical properties similar to those of the analysis target component (hereinafter referred to as an analog compound). Therefore, the standard substance for dispensing inspection is selected in consideration of the common technical knowledge, and a substance that can be captured by the magnetic beads during the specimen pretreatment, is sufficiently separated from the peak derived from the analysis target component or the internal standard substance in the mass chromatogram, and is detected within the range of the LC retention time in which the analysis target component is detected is selected as the standard substance for dispensing inspection.

First, chemical properties of the substance selected as the standard substance for dispensing inspection will be examined.

In the present embodiment, the analysis target component is captured by a hydrophobic interaction with the magnetic beads. In the LC, a reverse phase column is usually used as a separation column. Retention on the reverse phase column is basically based on the hydrophobic interaction. Therefore, for example, it is desirable that the standard substance for dispensing inspection has a degree of hydrophobicity same as that of the analysis target component so as to be captured by the magnetic beads and the reverse phase column. For example, a non-dissociated ionic compound is generally highly hydrophobic, so that the non-dissociated ionic compound can be strongly retained in the reverse phase column. A difference between dissociated and non-dissociated states arises from a relation between pH of a mobile phase of the LC and pKa of a compound. Generally, a retention behavior can be stabilized by setting the pKa of the analysis target component or the internal standard substance to a value that is +/−2 or more away from the pH of the mobile phase. That is, in consideration of the above and a balance between the pKa of the analysis target component or the internal standard substance and the mobile phase, it is important to select, as the standard substance for dispensing inspection, a substance that is sufficiently separated from the peak derived from the analysis target component or the internal standard substance in the mass chromatogram and is detected within the range of the LC retention time in which the analysis target component is detected.

Next, a molecular weight of the substance selected as the standard substance for dispensing inspection will be examined.

When the m/z of the ions derived from the standard substance for dispensing inspection overlaps with the m/z of other detected ions to an extent of being unable to be identified by mass resolution of the MS, there is a possibility that an increase in peak strength of the ions derived from the standard substance for dispensing inspection is mistakenly recognized. In this case, it is difficult to determine whether or not there is an abnormality in the dispensing amount. Since a normal MS has a mass resolution of approximately 1 (m/z), it is desirable that the m/z of the peaks of the mass chromatograms derived from the analysis target component, the internal standard substance, and the standard substance for dispensing inspection are at least 1 [Da], and preferably separated by 3 [Da] or more.

Here, particularly, in order to perform accurate analysis in the analysis of a specimen containing a large amount of contaminating components such as a biological specimen, it is desirable to use a device having an MS/MS method capable of detecting product ions as the MS used as the detector. When the MS/MS method is used, even if the m/z of precursor ions of respective substances are the same, the m/z of the product ions of respective substances are different.

An operation of the present embodiment configured as described above will be described.

Figure 6:
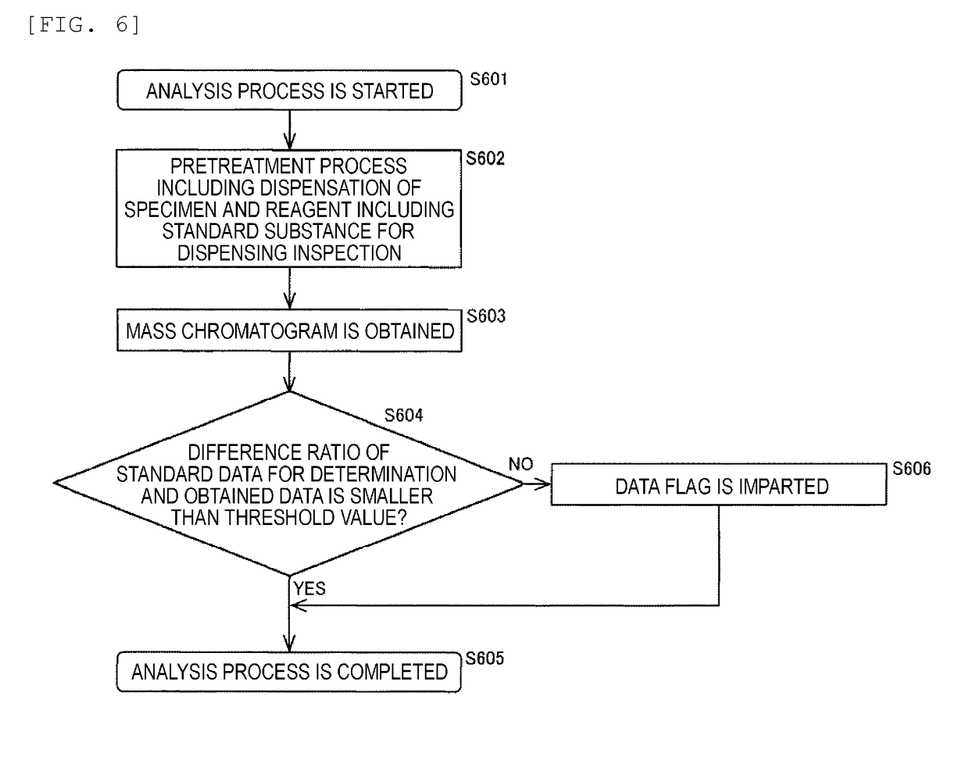
FIG. 6 is a flowchart illustrating the analysis process including a dispensing amount abnormality determination process according to the embodiment of the invention.

FIG. 6 is a flowchart illustrating the analysis process including the dispensing amount abnormality determination process according to the present embodiment.

In FIG. 6, first, when a start of the analysis process is instructed by the input unit 103 or the like (step S601), the control unit 102 performs the pretreatment step (see FIG. 2) including dispensation of the analysis target specimen and reagents including the standard substance for dispensing inspection (step S602). Then, the pretreated solution is dispensed from the reaction vessel 116 to the separation unit 131 by the dispensing mechanism for separation unit 132, and the mass chromatograph of the component in the solution separated by the separation unit 131 in the mass analyzing unit 133 is obtained (step S603). At this time, the mass chromatogram of the standard substance for dispensing inspection is obtained together with the mass chromatogram of the analysis target component of the specimen.

Here, the difference ratio between the reference data for determination and the obtained data of the standard substance for dispensing inspection is calculated, and then it is determined whether or not the difference ratio is smaller than the difference ratio threshold value (step S604).

When a determination result in step S604 is YES, it is determined that there is no abnormality in the dispensing amount of the reagents including the standard substance for dispensing inspection in the pretreatment, the analysis result is stored in the storage unit 105 or displayed on the display unit 104, and then the analysis process is completed (step S605).

When the determination result in step S604 is NO, it is determined that there is an abnormality in the dispensing amount of the reagents including the standard substance for dispensing inspection in the pretreatment, a data flag indicating that it is determined that there is an abnormality in the dispensing amount is imparted to the analysis result (step S606), the analysis result is stored in the storage unit 105 or displayed on the display unit 104, and then the analysis process is completed (step S605).

Figure 7:
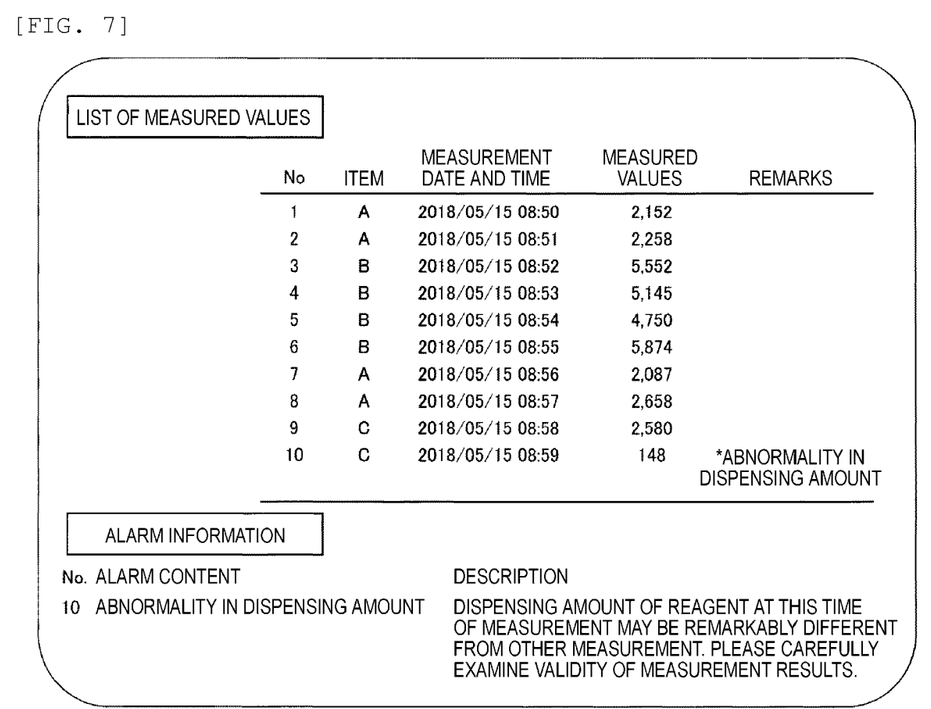
FIG. 7 is a diagram illustrating an example of an analysis result displayed on a display unit.

FIG. 7 is a diagram illustrating an example of the analysis result displayed on the display unit.

As shown in FIG. 7, as the analysis result displayed on the display unit 104, a specimen number that identifies a specimen, which is an analysis target; an analysis item corresponding to the analysis process performed on each specimen; a date and a time when measurement is performed; and a measured value, which is the amount of the component of the analysis target component contained in the analysis target specimen, are displayed correspondingly as a list of measured values.

In the dispensing amount abnormality determination process in the analysis process, regarding an analysis result (for example, specimen No. 10 in FIG. 7) that is determined to have an abnormality in the dispensing amount of the solution other than the specimen, a data flag (for example, display of "abnormality in dispensing amount" in a column of notes) is displayed, indicating that it is determined that there is an abnormality in the dispensing amount.

When the analysis result determined to have an abnormality in the dispensing amount is included, as additional alarm information, the specimen number in which the abnormality is determined, a content of the abnormality (here, abnormality in dispensing amount), and a description of the content of the abnormality are displayed.

Effects of the present embodiment configured as above will be described.

In the automatic analysis device that integrally performs the pretreatment and the analysis by the LC-MS, a predetermined amount of the solution, such as the specimen or the reagents, is dispensed into the reaction vessel to perform various processes related to the analysis. For example, during measurement of a drug concentration in blood, a deproteinization treatment is performed in which a reagent such as an organic solvent is dispensed and added as the deproteinization agent to the blood dispensed into the reaction vessel to denature and precipitate proteins in the blood. However, since an amount of the specimen or the reagent dispensed into the reaction vessel is small, an influence of dispensing accuracy on the analysis result is inevitably large. For example, when the dispensing amount of the reagent is less than the predetermined amount, an amount of a drug to be eluted decreases and thus shows a false low value, which may decrease analysis accuracy.

In response to the above, the present embodiment is configured to include: the specimen dispensing mechanism 113 (first dispensing mechanism) that dispenses the analysis target specimen in the reaction vessel 116; the reagent dispensing mechanism 123 (second dispensing mechanism) that dispenses another dispensing object different from the specimen in the reaction vessel 116; the mass analyzing unit 133 (analysis mechanism) that detects and analyzes a specific component in a reaction solution in which the specimen dispensed in the reaction vessel 116 and the another dispensing object are mixed to each other; and the control unit 102 (control device) that determines whether a dispensed liquid amount of the another dispensing object is abnormal or not, based on a detection result of the standard substance for dispensing inspection which has been added in advance to the another dispensing object, which is detected at the same time with detection of the analysis target component of the specimen in the reaction solution in the analysis mechanism 133. Therefore, it is possible to reliably detect the abnormality in the dispensing amount of the solution such as the specimen or the reagent to be dispensed and prevent the decrease in analysis accuracy.

For example, as a method for detecting the abnormality in the dispensing amount, a method of comparing a detection result of a pressure sensor provided inside the dispensing nozzle of the dispensing mechanism to the reference data for determination and then detecting the abnormality based on a comparison result is considered. However, in this method, since the pressure sensor that detects a pressure inside the dispensing nozzle of the dispensing mechanism is required, extra cost and space are required to provide the pressure sensor in the device. Particularly, when a dedicated dispensing mechanism is provided for each dispensing object such as the specimen or the reagent used for the analysis, the cost and space for the pressure sensors are required according to the number of the dispensing mechanisms for which the abnormality is to be detected.

In response to the above, according to the present embodiment, the cost and space for the pressure sensor are not required and an increase in cost and space is prevented, and it is possible to reliably detect the abnormality in the dispensing amount of the solution such as the specimen or the reagent to be dispensed and prevent the decrease in analysis accuracy.

For example, as the method for detecting the abnormality in the dispensing amount, a method of improving calibration accuracy of the dispensing amount as an influence of evaporation is small by dispensing the dispensing object having an amount (for example, 1 [ul] to 1000 [ul]) determined by a standard validation method and performing a test based on a dye method is also considered. However, in this method, since it is necessary to perform a test at a timing different from the analysis of the specimen, it is difficult to evaluate validity in the actual measurement for analyzing the specimen. During the test, the analysis of the specimen is stopped, which reduces a throughput, and furthermore, the user has to take time and effort to perform the test.

In response to the above, according to the present embodiment, since it is possible to determine the presence or absence of the abnormality in the dispensing amount at the same time as the analysis of the specimen, it is possible to evaluate the validity of the analysis in actual measurement and prevent a decrease in throughput and an increase in user effort, and it is also possible to reliably detect the abnormality in the dispensing amount of the solution such as the specimen or the reagent to be dispensed and prevent the decrease in analysis accuracy.

Modification

A modification of the present embodiment will be described with reference to FIG. 8. In the present modification, only differences from the present embodiment will be described, the same members in the drawings as those of the present embodiment are designated by the same reference numerals, and the descriptions thereof are omitted.

In the present modification, when it is determined that there is an abnormality in the dispensing amount, the device is switched to a maintenance mode in addition the imparting of the data flag.

Figure 8:
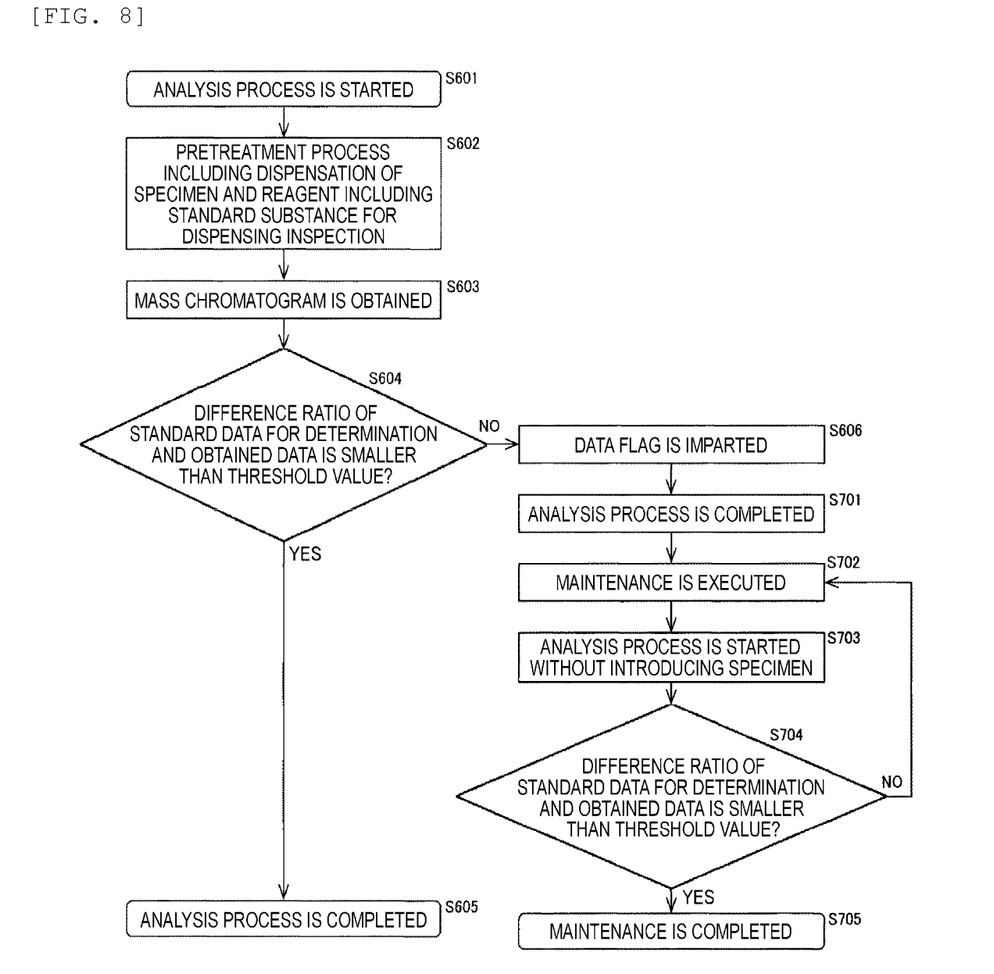
FIG. 8 is a flowchart illustrating the analysis process including a dispensing amount abnormality determination process according to a modification.

FIG. 8 is a flowchart illustrating an analysis process including a dispensing amount abnormality determination process according to the present modification.

In FIG. 8, first, when the start of the analysis process is instructed by the input unit 103 or the like (step S601), the control unit 102 performs the pretreatment step (see FIG. 2) including the dispensation of the analysis target specimen and the reagents including the standard substance for dispensing inspection (step S602). Then, the pretreated solution is dispensed from the reaction vessel 116 to the separation unit 131 by the dispensing mechanism for separation unit 132, and the mass chromatograph of the component in the solution separated by the separation unit 131 in the mass analyzing unit 133 is obtained (step S603). At this time, the mass chromatogram of the standard substance for dispensing inspection is obtained together with the mass chromatogram of the analysis target component of the specimen.

Here, the difference ratio between the reference data for determination and the obtained data of the standard substance for dispensing inspection is calculated, and it is determined whether or not the difference ratio is smaller than the difference ratio threshold value (step S604).

When the determination result in step S604 is YES, it is determined that there is no abnormality in the dispensing amount of the reagents including the standard substance for dispensing inspection in the pretreatment, the analysis result is stored in the storage unit 105 or displayed on the display unit 104, and then the analysis process is completed (step S605).

When the determination result in step S604 is NO, it is determined that there is an abnormality in the dispensing amount of the reagents including the standard substance for dispensing inspection in the pretreatment, the data flag indicating that it is determined that there is an abnormality in the dispensing amount is imparted to the analysis result (step S606), the analysis result is stored in the storage unit 105 or displayed on the display unit 104, and then the analysis process is completed (step S701).

Then, the device is switched to the maintenance mode, and maintenance of the automatic analysis device 100 is performed (step S702). The maintenance mode is a mode in which the device automatically cleans the dispensing nozzle and surrounding flow paths of the dispensing mechanism that is determined to be abnormal as the maintenance, and preparations are made for replacing the members of the dispensing mechanism.

Then, the analysis process is started without introducing the specimen to obtain the mass chromatogram (step S703), the difference ratio between the reference data for determination and the obtained data of the standard substance for dispensing inspection is calculated, and then it is determined whether or not the difference ratio is smaller than the difference ratio threshold value (step S704).

When a determination result in step S704 is NO, the maintenance is performed again, and then the processes of steps S702 to S704 are repeated until it is determined that there is no abnormality in the dispensing amount.

When the determination result in step S704 is YES, the maintenance mode is completed and the maintenance is completed (step S705).

Other configurations are the same as those of the present embodiment.

The present modification configured as above can exert effects same as those of the present embodiment.

APPENDIX

The invention is not limited to the above-described embodiment and modification, and includes various modifications. For example, the above-described embodiment is described in detail for easy understanding of the invention, and is not necessarily limited to one having all the configurations described. Each of the above-described configurations, functions, and the like may be implemented by being designed partially or entirely using an integrated circuit or the like. The above-described configurations, functions, and the like may also be implemented by software by interpreting and executing a program that implements the functions using a processor.

REFERENCE SIGN LIST

100: Automatic analysis device
101: Analysis unit
102: Control unit
103: Input unit
104: Display unit
105: Storage unit
111: Specimen container
112: Transport mechanism
113: Specimen dispensing mechanism
114: Dispensing chip attaching and detaching unit
115: Dispensing chip-mounted rack
115a: Dispensing chip
116: Reaction vessel
117: Reaction vessel-mounted rack
118: Transport mechanism
119: Opening part
120: Reaction vessel disc
121: Reagent container
122: Reagent disc
123: Reagent dispensing mechanism
124: Magnetic separation mechanism
125: Transport mechanism
126: Rotating orbit
131: Separation unit
132: Dispensing mechanism for separation unit
133: Mass analyzing unit
201: Analysis target component
203: Internal standard substance
205: Standard substance for dispensing inspection
207: Magnetic beads
209: Magnet
210: Magnetic bead group

The invention claimed is:

1. An automatic analysis device comprising:
a first dispensing mechanism that dispenses an analysis target specimen in a reaction vessel;
a second dispensing mechanism that dispenses another dispensing object different from the analysis target specimen in the reaction vessel;
an analysis mechanism that detects and analyzes an analysis target component in a reaction solution in which the analysis target specimen dispensed in the reaction vessel and the another dispensing object are mixed to each other; and
a control device,
wherein the control device determines whether a dispensed liquid amount of the another dispensing object is abnormal or not, based on a detection result of a standard substance for dispensing inspection which has been added in advance to the another dispensing object, which is detected at a same time as the detection of the analysis target component of the analysis target specimen in the reaction solution in the analysis mechanism.

2. The automatic analysis device according to claim 1, wherein
the control device determines whether the dispensed liquid amount of the another dispensing object is abnormal or not, based on a comparison result obtained by comparing a difference between a plurality of predetermined reference data for determination and a detection result of the standard substance for dispensing inspection to a predetermined threshold value.

3. The automatic analysis device according to claim 2, wherein
in a case where the difference is larger than the predetermined threshold value, the control device imparts a data flag indicating that the dispensed liquid amount of the another dispensing object may be abnormal to the analysis result of the analysis target component of the analysis target specimen.

4. The automatic analysis device according to claim 2, wherein
in a case where the difference is larger than the predetermined threshold value, the control device switches to a maintenance mode in which maintenance is executed without performing analysis of the analysis target specimen.

5. The automatic analysis device according to claim 1, wherein
the standard substance for dispensing inspection can be captured by magnetic beads and a column, and can be detected separately from the analysis target component by the analysis mechanism.

6. The automatic analysis device according to claim 1, wherein
the standard substance for dispensing inspection has hydrophobicity and is added to the another dispensing object at a predetermined concentration.

7. An analysis method comprising:
dispensing, by a first dispensing mechanism, an analysis target specimen in a reaction vessel;
dispensing, by a second dispensing mechanism, another dispensing object different from the analysis target specimen in the reaction vessel;
detecting and analyzing, by an analysis mechanism, an analysis target component in a reaction solution in which the analysis target specimen dispensed in the reaction vessel and the another dispensing object are mixed to each other; and
determining, by a control device, whether a dispensed liquid amount of the another dispensing object is abnormal or not, based on a detection result of a standard substance for dispensing inspection which has been added in advance to the another dispensing object, which is detected at a same time as the detection of the analysis target component of the analysis target specimen in the reaction solution in which the analysis target specimen dispensed in the reaction vessel and the another dispensing object different from the analysis target specimen are mixed to each other.

* * * * *

UNITED STATES PATENT AND TRADEMARK OFFICE
CERTIFICATE OF CORRECTION

PATENT NO. : 12,270,822 B2
APPLICATION NO. : 17/284687
DATED : April 8, 2025
INVENTOR(S) : Daisuke Ebihara et al.

Page 1 of 1

It is certified that error appears in the above-identified patent and that said Letters Patent is hereby corrected as shown below:

On the Title Page

PCT No. should be PCT/JP2019/033233 instead of PCT/EP2019/033233

Signed and Sealed this
Third Day of June, 2025

Coke Morgan Stewart
*Acting Director of the United States Patent and Trademark Office*